(12) United States Patent
Arakawa et al.

(10) Patent No.: US 12,544,699 B2
(45) Date of Patent: Feb. 10, 2026

(54) SUPPLY AIR DEMISTER

(71) Applicant: MITSUBISHI HEAVY INDUSTRIES, LTD., Tokyo (JP)

(72) Inventors: Yoshiaki Arakawa, Tokyo (JP); Takashi Ikeda, Tokyo (JP); Kenichi Iwanaga, Tokyo (JP); Go Tomatsu, Tokyo (JP); Koji Iwasaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 321 days.

(21) Appl. No.: 18/287,511

(22) PCT Filed: Feb. 14, 2022

(86) PCT No.: PCT/JP2022/005641
§ 371 (c)(1),
(2) Date: Oct. 19, 2023

(87) PCT Pub. No.: WO2022/230307
PCT Pub. Date: Nov. 3, 2022

(65) Prior Publication Data
US 2024/0382881 A1 Nov. 21, 2024

(30) Foreign Application Priority Data
Apr. 30, 2021 (JP) ................. 2021-077356

(51) Int. Cl.
*B01D 53/02* (2006.01)
*B01D 45/08* (2006.01)
*F02M 35/10* (2006.01)

(52) U.S. Cl.
CPC ............. *B01D 45/08* (2013.01); *F02M 35/10* (2013.01)

(58) Field of Classification Search
CPC .......... B01D 45/08; F02M 35/10; Y02T 10/12
See application file for complete search history.

(56) References Cited

U.S. PATENT DOCUMENTS

| 4,072,478 A | * | 2/1978 | Regehr | B01D 45/16 55/440 |
| 4,968,328 A | * | 11/1990 | Duke | B01D 45/08 55/440 |

(Continued)

FOREIGN PATENT DOCUMENTS

| EP | 3 059 434 A1 | 8/2016 |
| JP | 57-187635 U | 11/1982 |

(Continued)

OTHER PUBLICATIONS

International Search Report dated Apr. 5, 2022 for Application No. PCT/JP2022/005641 with an English translation.

(Continued)

*Primary Examiner* — Christopher P Jones
(74) *Attorney, Agent, or Firm* — BIRCH, STEWART, KOLASCH & BIRCH, LLP

(57) ABSTRACT

This supply air demister comprises a duct forming a flow channel through which supply air flows upward from below, and a demister body provided above the duct. The demister body has: a plurality of gutter parts having a receiving surface depressed downward and extending obliquely, and provided side by side at intervals from each other; and a plurality of return parts provided above the gutter parts, having a return surface depressed upward, and provided side by side at intervals from each other. The return parts are configured such that a return surface overlaps with an adjacent receiving surface in the extending direction of the return surface as viewed in the vertical direction.

7 Claims, 3 Drawing Sheets

(56) References Cited

U.S. PATENT DOCUMENTS

| | | | | |
|---|---|---|---|---|
| 2001/0015136 A1* | 8/2001 | Letzel | ................... | B01D 3/20 |
| | | | | 96/356 |
| 2005/0236724 A1* | 10/2005 | Buchanan | ............... | B01D 45/08 |
| | | | | 261/114.1 |
| 2007/0137154 A1* | 6/2007 | Agnello | ................ | B01D 45/08 |
| | | | | 55/440 |
| 2010/0024646 A1* | 2/2010 | Brookman | ............ | B01D 47/06 |
| | | | | 96/276 |
| 2010/0326026 A1* | 12/2010 | Bratton | ................. | B01D 45/06 |
| | | | | 55/440 |
| 2011/0303089 A1* | 12/2011 | Xu | ......................... | B01D 3/008 |
| | | | | 95/213 |
| 2013/0047562 A1* | 2/2013 | Paris | ..................... | B01D 45/06 |
| | | | | 55/308 |
| 2015/0128543 A1* | 5/2015 | Piszczek | ............... | B01D 50/20 |
| | | | | 55/440 |

FOREIGN PATENT DOCUMENTS

| | | |
|---|---|---|
| JP | 61-185316 A | 8/1986 |
| JP | 2001-295644 A | 10/2001 |
| JP | 2005-125201 A | 5/2005 |
| JP | 2010-144703 A | 7/2010 |
| JP | 2016-121538 A | 7/2016 |
| JP | 6314400 B2 | 4/2018 |

OTHER PUBLICATIONS

Written Opinion of the International Searching Authority dated Apr. 5, 2022 for Application No. PCT/JP2022/005641 with an English translation.

* cited by examiner

SUPPLY AIR DEMISTER

TECHNICAL FIELD

The present disclosure relates to a supply air demister.

Priority is claimed on Japanese Patent Application No. 2021-077356, filed on Apr. 30, 2021, the content of which is incorporated herein by reference.

BACKGROUND ART

In a high-power engine system, a turbocharger is used to ensure supply air pressure. An intercooler for cooling supply air is provided between an engine body and the turbocharger.

In the intercooler, condensed water is generated as the supply air is cooled. When the condensed water enters the engine body, a valve is damaged due to heat shock, which is a risk. Therefore, for example, in the related art, a device called a condensed water separation device (supply air demister) described in PTL 1 has been used. In this device, condensed water is separated by disposing a punched metal on a flow path.

CITATION LIST

Patent Literature

[PTL 1] Japanese Patent No. 6314400

SUMMARY OF INVENTION

Technical Problem

However, when the punched metal is used as described above, there is a possibility that the separated condensed water scatters along with the flow of supply air. In addition, since the punched metal blocks the flow path, the punched metal may cause pressure loss in the supply air. As a result, the performance of the supply air demister and the performance of the engine deteriorate.

The present disclosure has been made to solve the foregoing problems, and an object of the present disclosure is to provide a supply air demister with further improved performance.

Solution to Problem

In order to solve the foregoing problems, according to the present disclosure, there is provided a supply air demister including: a duct forming a flow path through which supply air flows from a bottom to a top; and a demister body provided above the duct. The demister body includes a plurality of gutter portions having receiving surfaces that are recessed downward and that extend in an inclined manner, and provided side by side at intervals from each other, and a plurality of return portions provided above the gutter portions, having return surfaces recessed upward, and provided side by side at intervals from each other. When viewed in an up-down direction, the return surface of each of the return portions straddles the adjacent receiving surfaces along an extending direction of the return surface.

Advantageous Effects of Invention

According to the present disclosure, it is possible to provide the supply air demister with further improved performance.

DESCRIPTION OF EMBODIMENTS

Configuration of Supply Air Demister

Figure 1:
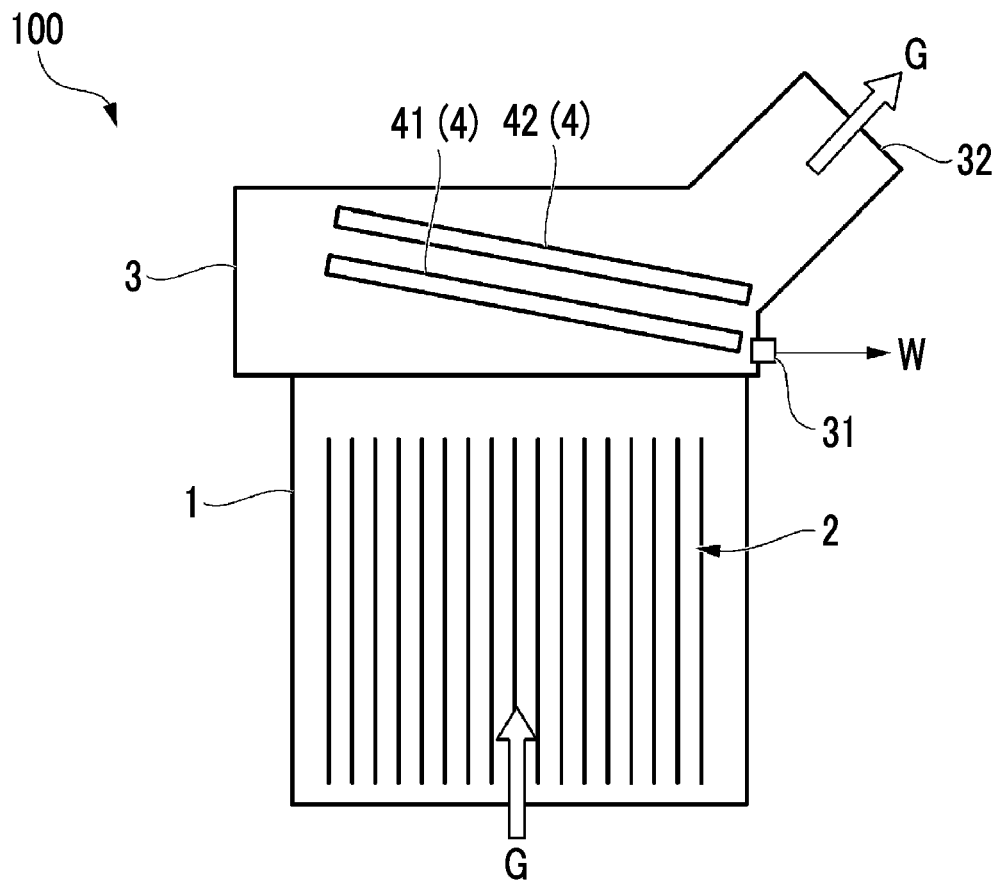
FIG. 1 is a cross-sectional view of a supply air demister according to an embodiment of the present disclosure.

Hereinafter, a supply air demister 100 according to an embodiment of the present disclosure will be described with reference to FIGS. 1 and 2. The supply air demister 100 is a device provided on a downstream side of an intercooler that cools exhaust gas from an engine to a certain temperature when supplying the exhaust gas to a turbocharger. Specifically, as shown in FIG. 1, the supply air demister 100 includes a duct 1, a header 3, and a demister body 4.

The duct 1 has a tubular shape, and supply air G flows through the duct 1 from the bottom toward the top. An intercooler 2 is provided inside the duct 1. The intercooler 2 is, for example, a fin-and-tube type heat exchanger, and exchanges heat between a refrigerant flowing therethrough and the supply air G. Accordingly, the temperature of the supply air G decreases.

The header 3 is integrally provided on the duct 1. The demister body 4 is accommodated inside the header 3. The supply air G containing moisture, which has flowed from the duct 1, is separated into gas and liquid by the demister body 4. Of the gas and the liquid, the supply air G from which the moisture is removed is discharged to the outside from an exhaust port 32 provided at an upper portion of the header 3.

Configuration of Demister Body

Next, a configuration of the demister body 4 will be described with reference to FIGS. 1 and 2. The demister body 4 includes a gutter portion 41 and a return portion 42.

As shown in FIG. 1, both the gutter portion 41 and the return portion 42 are inclined with respect to a horizontal direction. Unlike this example, a configuration in which only the gutter portion 41 is inclined can also be adopted.

Figure 2:
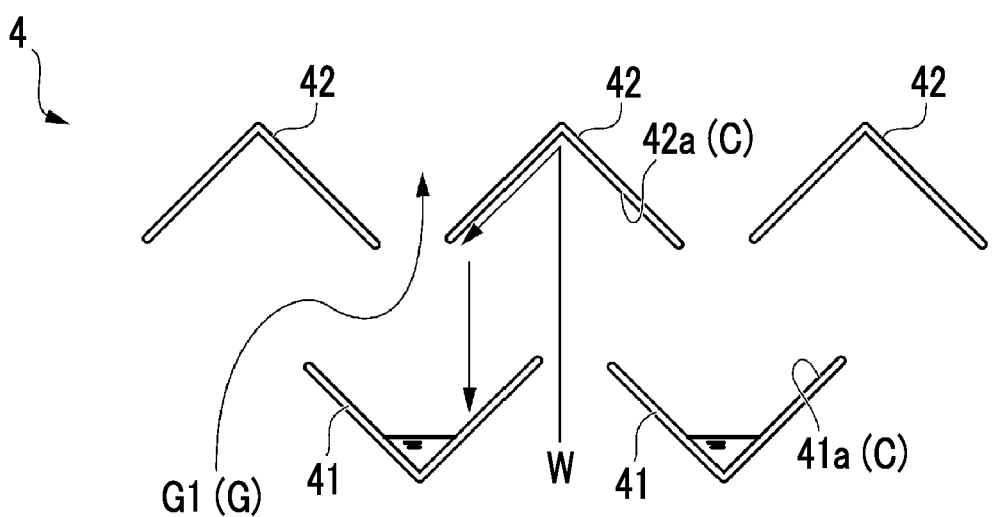
FIG. 2 is a cross-sectional view of a demister body according to the embodiment of the present disclosure.

Further, as shown in FIG. 2, the gutter portion 41 and the return portion 42 have an L-shaped cross-sectional shape. The gutter portion 41 is recessed downward. A surface of the gutter portion 41, which faces upward, is a receiving surface 41a. A water-repellent coating layer C is provided on the receiving surface 41a. A plurality of the gutter portions 41 are arranged at intervals in the horizontal direction.

A plurality of the return portions 42 are provided above the gutter portions 41. Each of the return portions 42 is recessed upward. A surface of the return portion 42, which faces downward, is a return surface 42a. Similarly to the receiving surface 41a, the water-repellent coating layer C is provided on the return surface 42a. Similarly to the gutter portions 41, the return portions 42 are arranged at intervals in the horizontal direction. When viewed in an up-down direction, the return surface 42a of each of the return portions 42 straddles the receiving surfaces 41a of the gutter portions 41 over the entire range along an extending direction of the return surface 42a, the gutter portions 41 being located therebelow and being adjacent thereto in the up-down direction. Namely, when viewed in the up-down direction, the return surface 42a and the receiving surface 41a at least partially overlap each other. In other words, the positions of the gutter portion 41 and the return portion 42 in the horizontal direction are offset from each other.

Actions and Effects

Subsequently, the operation of the supply air demister 100 will be described. First, the supply air G is guided into the duct 1. Then, the supply air G is cooled by the intercooler 2. The supply air G in a cooled state comes into contact with the demister body 4 inside the header 3. At this time, as shown in FIG. 2, a gas-phase component G1 in the supply air G flows through gaps between the gutter portions 41 and the return portions 42 described above from the bottom toward the top.

On the other hand, moisture W contained in the supply air G is condensed on the return surfaces 42a of the return portions 42. As indicated by an arrow in FIG. 2, the moisture W flows down the return surfaces 42a due to the action of gravity, and then flows down to the gutter portions 41 therebelow. Since the gutter portions 41 are inclined with respect to the horizontal direction as described above, the moisture W flows downward along the inclination. Thereafter, the moisture W is discharged to the outside through a discharge port 31 (refer to FIG. 1) of the header 3 connected to the gutter portions 41. Namely, lower end portions of the plurality of gutter portions 41 are connected to the discharge port 31.

According to the configuration, the moisture W contained in the supply air G that has flowed through the duct 1 is condensed and captured on the return surfaces 42a of the return portions 42. The captured moisture flows down to the gutter portions 41 located below due to gravity. Further, the moisture W flows downward along the inclination of the gutter portions 41 due to gravity, and is taken out to the outside. Accordingly, the possibility that the moisture W scatters from the demister body 4 and returns into the supply air G can be reduced. In addition, since the gutter portions 41 and the return portions 42 are arranged at intervals from each other, the flow of the supply air G is not obstructed. For this reason, the occurrence of pressure loss in the supply air demister 100 can also be suppressed.

Further, according to the configuration, since the return surfaces 42a are inclined, the condensed moisture W can drip toward the receiving surfaces 41a while flowing downward in an inclination direction. Accordingly, the moisture can be more quickly evacuated from a flow path.

In addition, according to the configuration, the moisture W stored on the gutter portions 41 is discharged to the outside through the discharge port 31 formed in the header 3. Since the moisture can be discharged by a differential pressure between an internal pressure of the header and the atmospheric pressure, other devices such as a pump are not required, and the manufacturing cost and the maintenance cost of the device can be reduced.

In addition, according to the configuration, due to the coating layers C, the stay of the moisture W on the receiving surfaces 41a and return surfaces 42a can be avoided, and the moisture W is allowed to quickly flow down. Accordingly, the possibility that the moisture W scatters from the demister body 4 can be further reduced.

Figure 3:
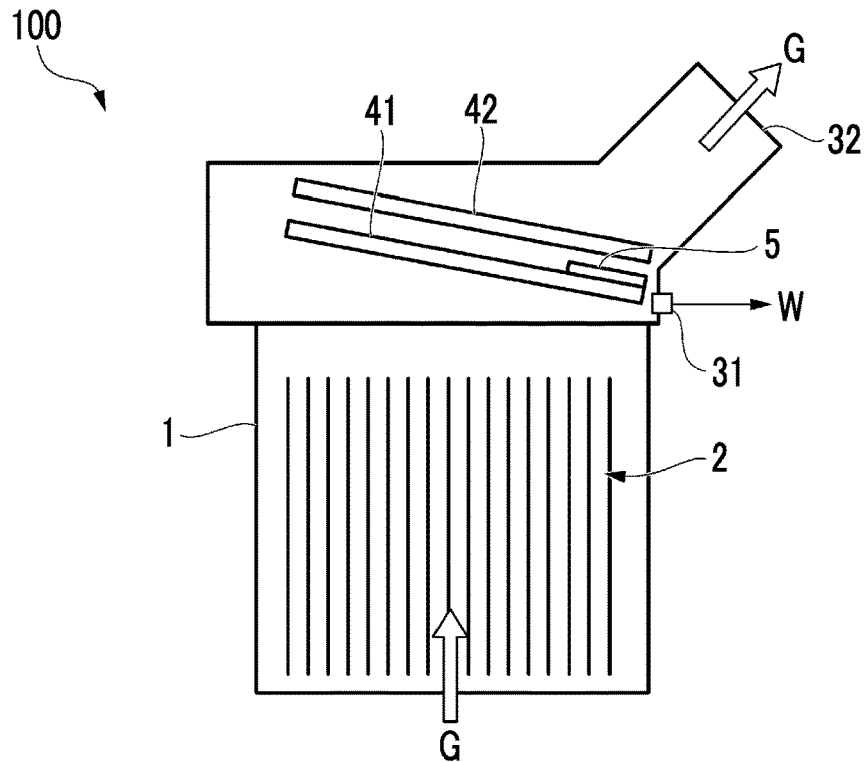
FIG. 3 is a view showing a modification example of the demister body according to the embodiment of the present disclosure.

The embodiment of the present disclosure has been described above. Various changes or improvements can be made to the configuration without departing from the concept of the present disclosure. For example, as a modification example, as shown in FIG. 3, a configuration in which a cover portion 5 covering at least the lower end portion of the gutter portion 41 from above is further provided can also be adopted. According to this configuration, since the cover portion 5 is provided, the possibility that moisture which has once dripped onto the gutter portion 41 scatters upward again can be reduced.

Figure 4:
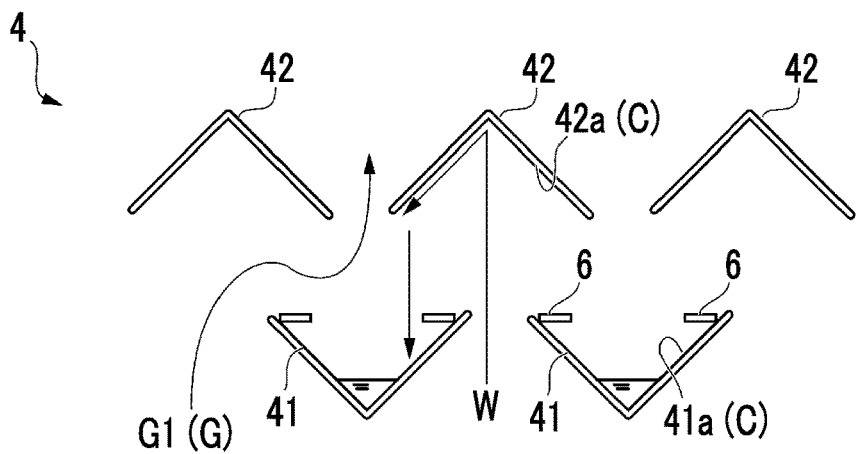
FIG. 4 is a view showing a further modification example of the demister body according to the embodiment of the present disclosure.

Further, as shown in FIG. 4, a configuration in which a pair of extension portions 6 extending from end edges of the gutter portion 41 toward a receiving surface 41a side are further provided can also be adopted. According to this configuration, since the gutter portion 41 is provided with the extension portions 6, the possibility that moisture which has once dripped onto the gutter portion 41 scatters upward again can be further reduced.

Figure 5:
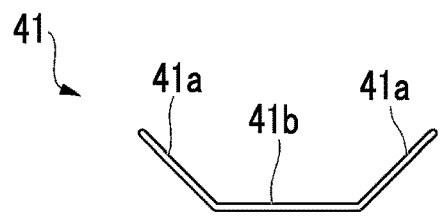
FIG. 5 is a view showing another modification example of the demister body according to the embodiment of the present disclosure.
Figure 6:
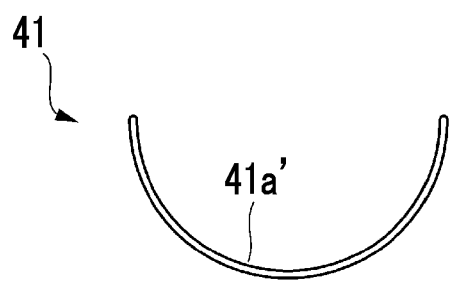
FIG. 6 is a view showing another modification example of the demister body according to the embodiment of the present disclosure.

In addition, the gutter portion 41 can also have shapes as shown in FIGS. 5 and 6. In the example of FIG. 5, the gutter portion 41 has a bottom surface 41b and the receiving surface 41a extending obliquely from end edges of the bottom surface 41b. In the example of FIG. 6, the gutter portion 41 has a semi-cylindrical shape. An inner peripheral surface of the gutter portion 41 is a receiving surface 41a'. According to these configurations, compared to the configuration in which the gutter portion 41 has an L-shaped cross-sectional shape described in the embodiment, the volume of the gutter portion 41 can be increased. Accordingly, a larger amount of moisture can be captured and discharged.

In addition, although not shown in detail, a plurality of the gutter portions 41 and a plurality of the return portions 42 can also be stacked in the up-down direction. In addition, a configuration in which only one layer of the gutter portions 41 is provided and two or more layers of the return portions 42 are provided thereabove can also be adopted. In any configuration, it is desirable that the return portions 42 at least partially overlap each other when viewed in the up-down direction. According to such a configuration, the processing performance (the capture amount of moisture) of the demister body 4 can be further enhanced.

Additional Notes

The supply air demister 100 described in each embodiment is understood, for example, as follows.

(1) A supply air demister 100 according to a first aspect includes: a duct 1 forming a flow path through which supply air G flows from a bottom to a top; and a demister body 4 provided above the duct 1. The demister body 4 includes a plurality of gutter portions 41 having receiving surfaces 41a that are recessed downward and that extend in an inclined manner, and provided side by side at intervals from each other, and a plurality of return portions 42 provided above the gutter portions 41, having return surfaces 42a recessed upward, and provided side by side at intervals from each other. When viewed in an up-down direction, the return surface 42a of each of the return portions 42 straddles the adjacent receiving surfaces 41a along an extending direction of the return surface 42a.

According to the configuration, the moisture W contained in the supply air G that has flowed through the duct 1 is condensed and captured on the return surfaces 42a of the return portions 42. The captured moisture W flows down to the gutter portions 41 located below due to gravity. Further, the moisture W flows downward along the inclination of the gutter portions 41 due to gravity, and is taken out to the outside. Accordingly, the possibility that the moisture W scatters from the demister body 4 can be reduced. In addition, since the gutter portions 41 and the return portions 42 are arranged at intervals from each other, the flow of the supply air G is not obstructed. For this reason, the occurrence of pressure loss in the supply air demister 100 can also be suppressed.

(2) In the supply air demister 100 according to a second aspect, the return surfaces 42a may be inclined to be parallel to the receiving surfaces 41a.

According to the configuration, since the return surfaces 42a are inclined, the condensed moisture can drip toward the receiving surfaces 41a while flowing downward in an inclination direction. Accordingly, the moisture can be more quickly evacuated from a flow path.

(3) The supply air demister 100 according to a third aspect may further include a header 3 which is provided on the duct 1 and in which a discharge port 31 that guides a fluid to an outside is formed, and lower end portions of the plurality of gutter portions 41 may be connected to the discharge port 31.

According to the configuration, the moisture W stored on the gutter portions 41 is discharged to the outside through the discharge port 31 formed in the header 3. Since the moisture can be discharged by a differential pressure between an internal pressure of the header and the atmospheric pressure, other devices such as a pump are not required, and the manufacturing cost and the maintenance cost of the device can be reduced.

(4) The supply air demister 100 according to a fourth aspect may further include extension portions 6 extending from end edges of each of the gutter portions 41 toward a receiving surface 41a side.

According to the configuration, since the gutter portion 41 is provided with the extension portions 6, the possibility that the moisture which has once dripped onto the gutter portion 41 scatters upward again can be reduced.

(5) The supply air demister 100 according to a fifth aspect may further include a cover portion 5 covering at least a lower end portion of each of the gutter portions 41 from above.

According to the configuration, since the cover portion 5 is provided, the possibility that the moisture which has once dripped onto the gutter portion 41 scatters upward again can be reduced.

(6) In the supply air demister 100 according to a sixth aspect, a plurality of the gutter portions 41 and a plurality of the return portions 42 stacked in the up-down direction may be provided.

According to the configuration, since the plurality of gutter portions 41 and the plurality of return portions 42 are stacked in the up-down direction, a larger amount of the moisture can be condensed and captured. Accordingly, the processing performance of the supply air demister 100 can be improved.

(7) The supply air demister 100 according to a seventh aspect may further include water-repellent coating layers C provided on the receiving surfaces 41a and the return surfaces 42a.

According to the configuration, due to the coating layers C, the stay of the moisture on the receiving surfaces 41a and return surfaces 42a can be avoided, and the moisture is allowed to quickly flow down. Accordingly, the possibility that moisture scatters from the demister body 4 can be further reduced.

INDUSTRIAL APPLICABILITY

According to the present disclosure, it is possible to provide the supply air demister with further improved performance.

REFERENCE SIGNS LIST

100: supply air demister
1: duct
2: intercooler
3: header
4: demister body
5: cover portion
6: extension portion
31: discharge port
32: exhaust port
41: gutter portion
41a, 41a': receiving surface
41b: bottom surface
42: return portion
42a: return surface
G: supply air
W: moisture

The invention claimed is:

1. A supply air demister comprising:
a duct forming a flow path through which supply air flows from a bottom to a top; and
a demister body provided above the duct,
wherein the demister body includes a plurality of gutter portions having receiving surfaces that are recessed downward and that extend in an inclined manner, and provided side by side at intervals from each other, and a plurality of return portions provided above the gutter portions, having return surfaces recessed upward, and provided side by side at intervals from each other, and
when viewed in an up-down direction, the return surface of each of the return portions straddles the adjacent receiving surfaces along an extending direction of the return surface.

2. The supply air demister according to claim 1,
wherein the return surfaces are inclined to be parallel to the receiving surfaces.

3. The supply air demister according to claim 1, further comprising:
a header which is provided on the duct and in which a discharge port that guides a fluid to an outside is formed,
wherein lower end portions of the plurality of gutter portions are connected to the discharge port.

4. The supply air demister according to claim 1, further comprising:
extension portions extending from end edges of each of the gutter portions toward a receiving surface side.

5. The supply air demister according to claim 1, further comprising:

a cover portion covering at least a lower end portion of each of the gutter portions from above.

6. The supply air demister according to claim 1, wherein a plurality of the gutter portions and a plurality of the return portions stacked in the up-down direction are provided.

7. The supply air demister according to claim 1, further comprising:
water-repellent coating layers provided on the receiving surfaces and the return surfaces.

* * * * *